Patented May 23, 1933

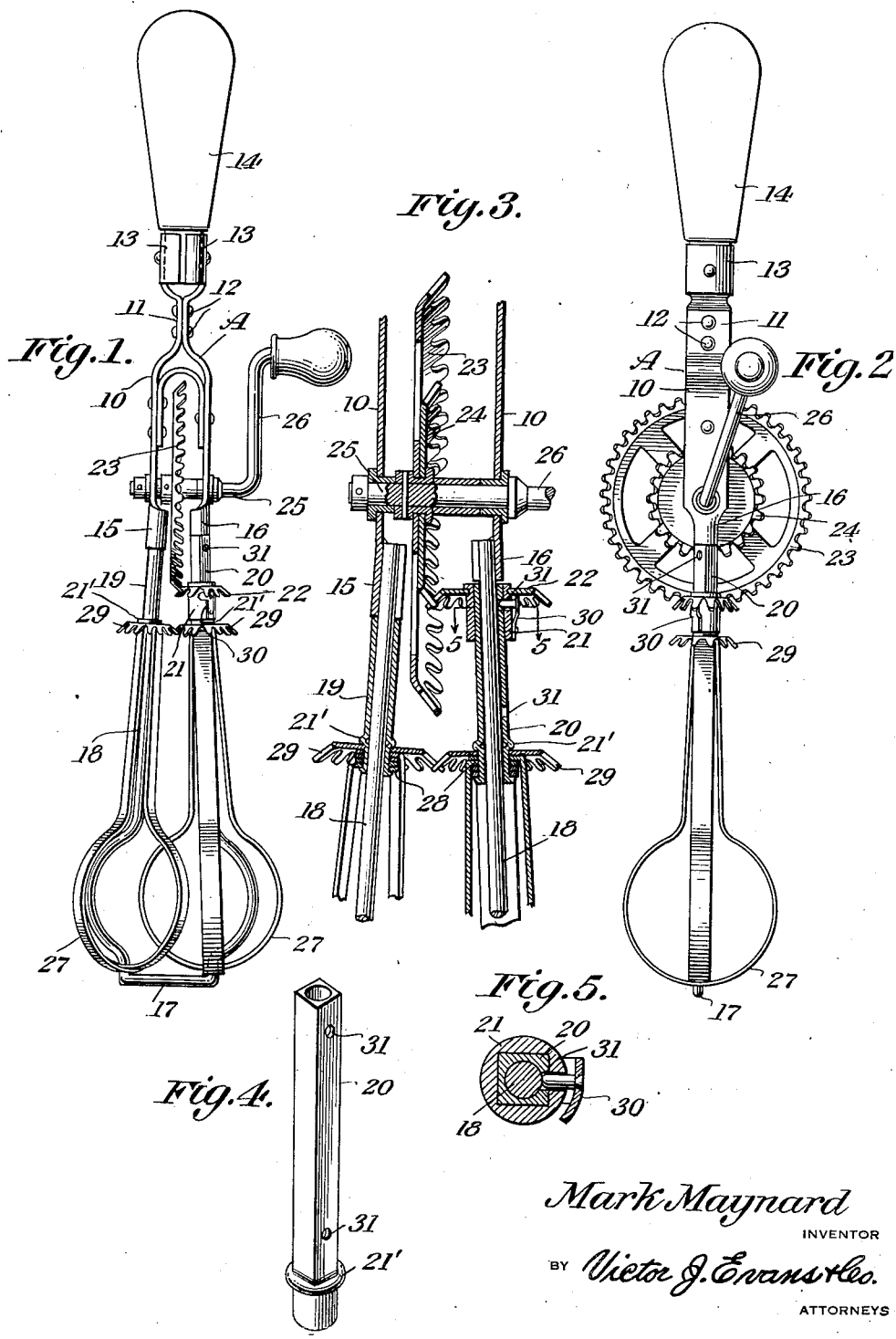

1,910,303

UNITED STATES PATENT OFFICE

MARK MAYNARD, OF WHITE BIRD, IDAHO

BEATER

Application filed June 15, 1932. Serial No. 617,427.

The invention relates to a beater and more especially to a hand operable beater for eggs or other substances having fluidity.

The primary object of the invention is the provision of a beater of this character, wherein a novel form of change gear is arranged therein so as to enable the agitators to be operated at different speeds and in the use the substance to be mixed will be brought to a uniform consistency, without strain upon the operator when turning the crank handle in the driving of the agitators of such beater and without liability of any slippage in the gearing due to strain imposed thereon.

Another object of the invention is the provision of a beater of this character wherein the construction thereof renders the same readily and easily operated without liability of the gearing becoming jammed or slippage during the working thereof when mixing substances having varying fluidity.

A further object of the invention is the provision of a beater of this character which is extremely simple in construction, thoroughly reliable and efficient in its purposes, light of weight yet strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the drawing:—

Figure 1 is a side elevation of a beater constructed in accordance with the invention.

Figure 2 is a view similar to Figure 1 showing the beater disposed at right angles to its position in said Figure 1.

Figure 3 is an enlarged fragmentary vertical sectional view through the beater showing in detail the change gearing.

Figure 4 is a perspective view of an adjunct of the beater.

Figure 5 is a sectional view on the line 5—5 of Figure 3 looking in the direction of the arrows.

Similar reference characters indicate corresponding parts throughout the several views in the drawing.

Referring to the drawing in detail, A designates generally the frame of the beater which includes a pair of strap-like side pieces 10, these being inwardly bent at 11 intermediate their ends and such bent portions are joined or united through rivets 12. The members 10 are formed with the ear terminals 13 between which is made fast a handle 14.

The side members have formed thereon sleeve extensions 15 and 16 respectively, the latter being of less length than the extension 15 for a purpose presently described. Anchored in the extensions 15 and 16 is a yoke 17, the side limbs 18 of which are fitted with turning sleeves 19 and 20 respectively, the sleeve 20 being squared in cross section externally thereof for accommodating the hub 21 of a shiftable pinion 22, the hub 21 being internally shaped correspondingly to the sleeve 20. This pinion 22 is adaptable for alternate meshing engagement with large and small gears 23 and 24 respectively, which are fixed to a shaft 25 journaled in the side members 10 of the frame A, the said shaft 25 being formed with a crank handle 26 for the manual driving thereof.

The side limbs 18 of the yoke 17 have journaled thereon the agitators 27, there being a pair upon each limb and each agitator is preferably of strap formation with inturned ends 28 overlapping each other and engaged with the companion sleeve 19 or 20. Each sleeve 19 or 20 has formed thereon coupling ribs 21' for the inbent ends 28 of the agitators 27 and also for the anchoring of meshing pinions 28 which are carried by and fixed to the said sleeve next to the inbent ends 28 of the agitators so that rotation imparted to the gears 23 and 24 will be transmitted through the pinion 22 to the meshing pinions 29, thereby operating the agitators 27 simultaneously with each other. The speed of rotation of the agitators 27 will be varied according to the engagement of the pinion 22 with either gear 23 or 24.

The hub 21 of the pinion 22 carries a spring latch 30 which is adapted to engage in keeper openings or holes 31 in the sleeve 20 so that this pinion 22 can be latched in its shifted position for meshing engagement with either the gear 23 or 24.

It should be apparent that the beater is susceptible of two speeds of operation due to the change speed gearing, the pinion 22 being manually shiftable upon the sleeve 20 for changing the meshing engagement thereof with either the gear 23 or 24. This change of speed in the driving of the beater is essential when agitating or mixing substances of varying density or consistency or fluidity and in this fashion relieving undue strain upon the gearing and labor on the part of the operator of the beater.

What is claimed is:—

A beater of the kind described comprising a frame including a pair of strap-like side pieces, the side pieces being inwardly bent intermediate thereof and joined together, sleeve extensions formed on the side pieces at one side of the inwardly bent portion, one sleeve extension being of less length than the other, a yoke anchored in said sleeve extensions, turning sleeves journaled on the yoke next to the sleeve extensions, one of the sleeves being squared in cross section, a hub slidably fitted on the squared sleeve, gears fixed to said turning sleeves and in meshing engagement with each other, agitators carried by the yoke and engaged with the turning sleeves, coupling ribs formed on the turning sleeves for anchoring said gears therewith and also the agitators, an operating crank shaft journaled in the side pieces of the frame, a speed changing gear carried by the crank shaft between the side pieces, a pinion on the hub and meshing with the speed changing gear, and a spring latch carried by the hub and engageable with the sleeve supporting the same to hold said hub in its adjusted position thereon.

In testimony whereof I affix my signature.

MARK MAYNARD.